(12) United States Patent
Kataoka

(10) Patent No.: US 9,495,795 B2
(45) Date of Patent: Nov. 15, 2016

(54) IMAGE RECORDING DEVICE, THREE-DIMENSIONAL IMAGE REPRODUCING DEVICE, IMAGE RECORDING METHOD, AND THREE-DIMENSIONAL IMAGE REPRODUCING METHOD

(75) Inventor: Mitsuteru Kataoka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 45 days.

(21) Appl. No.: 14/371,968

(22) PCT Filed: Jan. 16, 2012

(86) PCT No.: PCT/JP2012/000213
§ 371 (c)(1),
(2), (4) Date: Jul. 11, 2014

(87) PCT Pub. No.: WO2013/108285
PCT Pub. Date: Jul. 25, 2013

(65) Prior Publication Data
US 2015/0023589 A1 Jan. 22, 2015

(51) Int. Cl.
*G06T 7/00* (2006.01)
*G06T 15/20* (2011.01)
*H04N 13/00* (2006.01)

(52) U.S. Cl.
CPC ............ *G06T 15/20* (2013.01); *G06T 7/0075* (2013.01); *H04N 13/0011* (2013.01); *H04N 13/0022* (2013.01); *G06T 2207/10012* (2013.01); *H04N 2013/0081* (2013.01); *H04N 2213/005* (2013.01)

(58) Field of Classification Search
CPC ............... H04N 13/0022; H04N 2013/0081; G06T 2207/10012; G06T 15/20; G06T 7/0075

USPC ........................................................ 382/154
See application file for complete search history.

(56) References Cited

U.S. PATENT DOCUMENTS 5,287,437 A    2/1994 Deering
6,084,978 A *  7/2000 Taylor .................... G06T 15/10
                                                    348/E13.014

(Continued)

FOREIGN PATENT DOCUMENTS

JP    06-034343 A    2/1994
JP    06-187424 A    7/1994

(Continued)

OTHER PUBLICATIONS

English translation of: "Multi-Picture Format", Standard of the Camera & Imaging Products Association,CIPA DC-007-2009, Feb. 4, 2009, 61 pages.

(Continued)

*Primary Examiner* — Siamak Harandi
(74) *Attorney, Agent, or Firm* — McDermott Will & Emery LLP

(57) ABSTRACT

The image recording device includes: an image information obtaining unit obtaining a first image of the object viewed from a first viewpoint, a second image of the object viewed from a second viewpoint, and viewpoint positions each for one of the viewpoints; a depth information generating unit generating depth information items each indicating a depth of the object included in the first and second images; an image generating unit generating a third image and a viewpoint position of the third image, using the depth information items, the first image, and the second image, the third image being of the object viewed from a third viewpoint different from the first and second viewpoints; and a recording unit recording on the image file the first, second and third images in association with the viewpoint positions each for one of the first, second, and third images.

3 Claims, 15 Drawing Sheets

(56) References Cited

U.S. PATENT DOCUMENTS

| | | | | |
|---|---|---|---|---|
| 6,304,286 | B1* | 10/2001 | Shirai | G02B 27/0093 348/42 |
| 2001/0005204 | A1* | 6/2001 | Matsumoto | G06T 15/04 345/418 |
| 2001/0014171 | A1* | 8/2001 | Iijima | G06T 7/0065 382/154 |
| 2007/0282907 | A1* | 12/2007 | Chambers | G06F 17/30041 |
| 2008/0279449 | A1* | 11/2008 | Ramstad | H04N 13/0431 382/154 |
| 2010/0303327 | A1* | 12/2010 | Rankin | G06T 9/00 382/131 |
| 2011/0254925 | A1 | 10/2011 | Ushiki et al. | |
| 2012/0069004 | A1* | 3/2012 | Takama | H04N 13/0022 345/419 |
| 2012/0075432 | A1* | 3/2012 | Bilbrey | G01J 4/00 348/48 |
| 2012/0133644 | A1* | 5/2012 | Yamada | H04N 13/004 345/419 |
| 2012/0293492 | A1* | 11/2012 | Kuroume | H04N 13/0051 345/419 |
| 2013/0044188 | A1* | 2/2013 | Nakamura | H04N 13/0066 348/46 |
| 2014/0049544 | A1* | 2/2014 | Kobayashi | H04N 13/0018 345/427 |

FOREIGN PATENT DOCUMENTS

| | | |
|---|---|---|
| JP | 09-054376 A | 2/1997 |
| JP | 2004-200814 A | 7/2004 |
| JP | 2006-133665 A | 5/2006 |
| JP | 2008-310696 A | 12/2008 |
| JP | 2011-223482 A | 11/2011 |
| WO | 2011-136191 A1 | 11/2011 |

OTHER PUBLICATIONS

"Multi-Picture Format", Standard of the Camera & Imaging Products Association, CIPA DC-007-2009, Feb. 4, 2009, 59 pages.

International Search Report issued in PCT/JP2012/000213, dated Mar. 27, 2012.

* cited by examiner

FIG. 7A

| Viewing position area | | Left-eye image | Right-eye image | Width extending capability |
|---|---|---|---|---|
| Angle | Distance | | | |
| 45 degrees or greater to left (A1) | – | 241a | 241b | High |
| Between 15 degrees or greater and smaller than 45 degrees to left (A2) | – | 241a | 241c | Low |
| Between 15 degrees to left and 15 degrees to right exclusive (A3) | Near | 241a | 241d | OFF |
| Between 15 degrees to left and 15 degrees to right exclusive (A4) | Far | 241b | 241c | OFF |
| Between 15 degrees or greater and smaller than 45 degrees to right (A5) | – | 241b | 241d | Low |
| 45 degrees or greater to right (A6) | – | 241c | 241d | High |

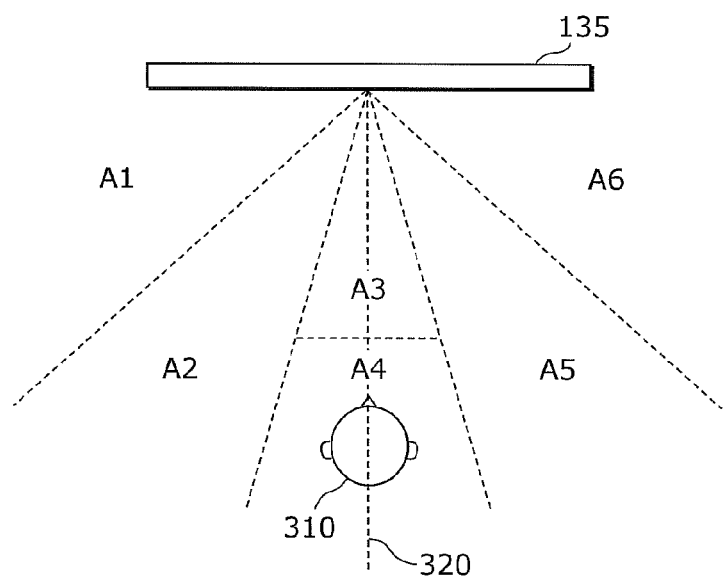

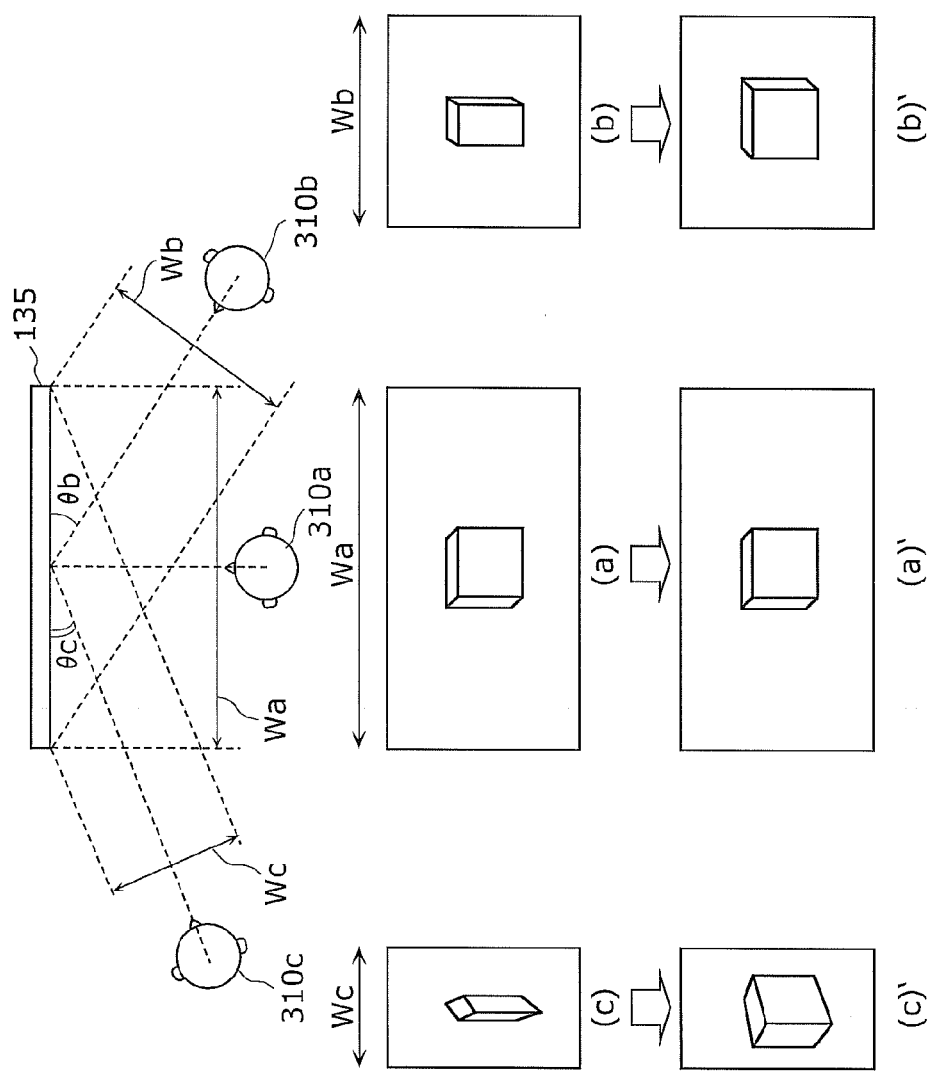

(a)

(b)

IMAGE RECORDING DEVICE, THREE-DIMENSIONAL IMAGE REPRODUCING DEVICE, IMAGE RECORDING METHOD, AND THREE-DIMENSIONAL IMAGE REPRODUCING METHOD

RELATED APPLICATIONS

This application is the U.S. National Phase under 35 U.S.C. §371 of International Application No. PCT/JP2012/000213, filed on Jan. 16, 2012, the disclosure of which Application is incorporated by reference herein.

TECHNICAL FIELD

The present invention relates to a device and a method for storing a three-dimensional (3D) image in a file, and a device and a method capable of reproducing the 3D image from multiple viewpoints using the stored file.

BACKGROUND ART

There are conventional techniques which disclose presenting a viewer with a 3D image obtained from any given viewpoint by generating and displaying a virtual image obtained at a place where the camera is not actually found at the time of reproduction, using two two-dimensional (2D) images (hereinafter referred to as "image" unless otherwise noted) each obtained by multiple cameras (see Patent Literature 1, or PTL 1). The technique described in PTL 1 is implemented in the steps below.

First, images obtained by multiple cameras are analyzed, and depth information indicating the depth of an object captured on the images is obtained. Next, each of the images are separated into partial images per depth, and the partial images that are separated into have the depth information assigned to and are outputted as image information. Finally, using trilateration, a right-eye image and a left-eye image are generated from the outputted image information based on the partial images, the depth information, and viewpoint positions of the viewer (a right-eye position and a left-eye position). Each of the right-eye image and the left-eye image is presented to a corresponding one of the eyes of the viewer. As a result, the viewer can three-dimensionally view an object from any given viewpoint.

Furthermore, Non Patent Literature 1, or NPL 1, defines the specifications of the Multi Picture Format (MPO file) that is a file format used for holding a 3D image. MPO files are widely used for digital still cameras (DSC) which obtain 3D still pictures. A single MPO file holds, for example, a left-eye image and a right-eye image each captured by a DSC having two imaging devices.

CITATION LIST

Patent Literature

[PTL 1]

Japanese Unexamined Patent Application Publication No. 2004-200814

[Non Patent Literature]

Standard of the Camera and Imaging Products Association, CIPA DC-007-2009, "Multi-Picture Format"

SUMMARY OF INVENTION

Technical Problem

When a 3D image is reproduced using an MPO file, the left-eye image and the right-eye image held in the MPO file provide the 3D image viewable only from a predetermined viewpoint. The problem is, however, that the technique cannot reproduce the 3D image from various viewpoints.

In addition, the technique disclosed in PTL 1 can reproduce a 3D image viewed from various viewpoints depending on the position of a viewer, by generating a virtual image. This technique, however, poses such problems as an increase in load for image processing and the resulting difficulty in displaying a 3D image from various viewpoints on a real-time basis.

The present invention is conceived in view of the above problems and aims to provide an image recording device and a 3D image reproducing device which can reproduce a 3D image from various viewpoints on a real-time basis.

Solution to Problem

In order to solve the above problems, an image recording device according to an aspect of the present invention records, on an image file, images of an object viewed from different viewpoints. The image recording device includes: an image information obtaining unit which obtains a first image of the object viewed from a first viewpoint, a second image of the object viewed from a second viewpoint which is different from the first viewpoint, and viewpoint positions each corresponding to one of the first viewpoint and the second viewpoint; a depth information generating unit which generates depth information items each indicating a depth of the object included in the first image and the second image, using the first image, the second image, and the viewpoint positions each for one of the first image and the second image; an image generating unit which generates a third image and a viewpoint position of the third image, using the depth information items, the first image, and the second image, the third image being of the object viewed from a third viewpoint which is different from the first viewpoint and the second viewpoint; and a recording unit which records on the image file the first image, the second image, and the third image in association with the viewpoint positions each for one of the first image, the second image, and the third image.

Such features make it possible to record actually obtained images and virtual images generated from the obtained images in association with viewpoint positions each corresponding to one of the actually obtained images and one of the virtual images, which contributes to decreasing image processing load and reproducing a 3D image viewed from various viewpoints on a real-time basis.

The recording unit may record on the image file image selecting information for: dividing an area into viewing position areas; selecting from among the first image, the second image, and the third image a left-eye image and a right-eye image to be respectively presented to a left eye and a right eye of a viewer located in one of the viewing position areas; and associating the one of the viewing position areas with the left-eye image and the right-eye image, the area being likely to include a viewing position from which a display device is viewed, and the display device displaying the images recorded on the image file.

An image recording device according to another aspect of the present invention records, on an image file, images of an object viewed from different viewpoints. The image recording device may include: an image information obtaining unit which obtains a first image of the object viewed from a first viewpoint, a second image of the object viewed from a second viewpoint which is different from the first viewpoint, and viewpoint positions each corresponding to one of the first viewpoint and the second viewpoint; a depth information generating unit which generates depth information items each indicating a depth of the object included in the first image and the second image, using the first image, the second image, and the viewpoint positions each for one of the first image and the second image; a depth image generating unit which generates depth images each corresponding to one of the first image and the second image, by expressing the depth indicated in each of the depth information items in a luminance value; and a recording unit which associates the first image and the second image with the viewpoint positions and the depth images each corresponding to one of the first image and the second image, and records the first image and the second image on the image file.

Such features make it possible to previously store depth information items, which are a cause of high load, in image processing and effectively carry out the image processing. This contributes to reproducing a 3D image viewed from various viewpoints.

In addition, the image file may be in a multi-picture format.

In other words, the present invention is applicable with an MPO file generated in an existing multi-picture format.

A three-dimensional (3D) image reproducing device according to an aspect of the present invention provides a display device with an image, recorded on an image file, in a form of a 3D image. The image file holds images of an object, viewed from different viewpoints, in association with viewpoint positions each corresponding to one of the images, the images being at least three images. The 3D image reproducing device includes: a viewing position obtaining unit which obtains a viewing position of the viewer, watching the 3D image, to the display device; an image selecting unit which selects, from among the images held in the image file, a left-eye image and a right-eye image, the left-eye image having a viewpoint position, included in the viewpoint positions, on left of the viewing position, and the right-eye image having a viewpoint position, included in the viewpoint positions, on right of the viewing position; and an outputting unit which alternately outputs to the display device the left-eye image and the right-eye image selected by the image selecting unit.

Such features make it possible to display a 3D image based on the combination of multiple images recorded in the image file. Hence the features make it possible to carry out effective image processing, which contributes to reproducing a 3D image from various viewpoints on a real-time basis.

Furthermore, the image selecting unit may select the left-eye image and the right-eye image so that disparity between the left-eye image and the right-eye image decreases with an increasing size of a display screen for the display device.

Moreover, the image selecting unit may select the left-eye image and the right-eye image so that disparity between the left-eye image and the right-eye image increases with a decreasing distance between the viewing position and the display device.

In addition, the image selecting unit may generate image selecting information for associating each of viewing position areas with the left-eye image and the right-eye image, and select from the image selecting information the left-eye image and the right-eye image corresponding to the viewing position obtained by the viewing position obtaining unit, the viewing position areas being areas into which an area that is likely to include the viewing position is divided, and the left-eye image and the right-eye image being to be presented to the viewer located in the viewing position area.

Such features make it possible to appropriately select images depending on a viewing position, which contributes to more natural reproduction of a 3D image.

A 3D image reproducing device according to another aspect of the present invention provides a display device with an image recorded on an image file. The image file holding images of an object, viewed from different viewpoints, in association with viewpoint positions each corresponding to one of the images and with depth images indicating, in a form of luminance values, depths of the object included in each of the images. The 3D image reproducing device includes: a viewing position obtaining unit which obtains a viewing position of a viewer, watching the 3D image, to the display device; an image generating unit which generates a left-eye image and a right-eye image using the images, the viewpoint positions each corresponding to one of the images, and the depth images all of which are held in the image file, the left-eye image having a viewpoint position, included in the viewpoint positions, on left of the viewing position, and the right-eye image having a viewpoint position, included in the viewpoint positions, on right of the viewing position; and an outputting unit which alternately outputs to the display device the left-eye image and the right-eye image generated by the image generating unit.

Such features make it possible to generate a 3D image from multiple images and an image file holding depth information items each corresponding to one of the images. Hence the features can eliminate the need for generating new depth information items, which are a cause of high load, in image processing, and effectively carry out the image processing. Consequently, a 3D image from various viewpoints can be reproduced on a real-time basis.

Furthermore, the image generating unit may generate the left-eye image and the right-eye image so that disparity between the left-eye image and the right-eye image decreases with an increasing size of a display screen for the display device.

Moreover, the image generating unit may generate the left-eye image and the right-eye image so that disparity between the left-eye image and the right-eye image increases with a decreasing distance between the viewing position and the display device.

Such features make it possible to appropriately generate images depending on a viewing position, which contributes to more natural reproduction of a 3D image.

In addition, the outputting unit may enlarge the left-eye image and the right-eye image in a horizontal direction with a decreasing angle formed between (i) a straight line from the viewing position to a center of a display screen for the display device and (ii) the display screen, and output the enlarged left-eye image and the enlarged right-eye image.

Such a feature makes it possible to reproduce a 3D image more naturally even though the viewer looks at the display device from an angle.

An image recording method according to an aspect of the present invention is for recording, on an image file, images of an object viewed from different viewpoints. The image recording method includes: obtaining a first image of the object viewed from a first viewpoint, a second image of the object viewed from a second viewpoint which is different from the first viewpoint, and viewpoint positions each corresponding to one of the first viewpoint and the second viewpoint; generating depth information items each indicating a depth of the object included in the first image and the second image, using the first image, the second image, and the viewpoint positions each for one of the first image and the second image; generating a third image and a viewpoint position of the third image, using the depth information items, the first image, and the second image, the third image being of the object viewed from a third viewpoint which is different from the first viewpoint and the second viewpoint; and recording on the image file the first image, the second image, and the third image in association with the viewpoint positions each for one of the first image, the second image, and the third image.

An image recording method according to another aspect of the present invention is for recording, on an image file, images of an object viewed from different viewpoints. The image recording method includes: obtaining a first image of the object viewed from a first viewpoint, a second image of the object viewed from a second viewpoint which is different from the first viewpoint, and viewpoint positions each corresponding to one of the first viewpoint and the second viewpoint; generating depth information items each indicating a depth of the object included in the first image and the second image, using the first image, the second image, and the viewpoint positions each for one of the first image and the second image; generating depth images each corresponding to one of the first image and the second image, by expressing the depth indicated in each of the depth information items in a luminance value; and associating the first image and the second image with the viewpoint positions and the depth images each corresponding to one of the first image and the second image, and recording the first image and the second image on the image file.

A 3D image reproducing method according to an aspect of the present invention is for providing a display device with an image, recorded on an image file and selected from among images, in a form of a 3D image. The image file holding images of an object, viewed from different viewpoints, in association with viewpoint positions each corresponding to one of the images, the images being at least three images. The 3D image reproducing method includes: obtaining a viewing position of a viewer, watching the 3D image, to the display device; selecting, from among the images held in the image file, a left-eye image and a right-eye image, the left-eye image having a viewpoint position, included in the viewpoint positions, on left of the viewing position, and the right-eye image having a viewpoint position, included in the viewpoint positions, on right of the viewing position; and alternately outputting to the display device the left-eye image and the right-eye image selected in the selecting.

A 3D image reproducing method according to another aspect of the present invention is for providing a display device with a 3D image generated from images recorded on an image file. The image file holding images of an object, viewed from different viewpoints, in association with viewpoint positions each corresponding to one of the images and with depth images indicating, in a form of luminance values, depths of the object included in each of the images. The 3D image reproducing method includes: obtaining a viewing position of a viewer, watching the 3D image, to the display device; generating a left-eye image and a right-eye image using the images, the viewpoint positions, and the depth images all of which are held in the image file, the left-eye image having a viewpoint position, included in the viewpoint positions, on left of the viewing position, and the right-eye image having a viewpoint position, included in the viewpoint positions, on right of the viewing position; and alternately outputting to the display device the left-eye image and the right-eye image generated in the generating.

Advantageous Effects of Invention

The present invention can reproduce a 3D image from various viewpoints on a real-time basis, using limited images.

BRIEF DESCRIPTION OF DRAWINGS

FIG. 7A represents an example of image selecting information.

FIG. 7B represents a top view illustrating exemplary viewing position areas.

FIG. 8 represents a schematic view for explaining a width extending capability.

DESCRIPTION OF EMBODIMENTS

Described hereinafter in detail are embodiments of the present invention, with reference to the drawings. It is noted that the embodiments of the present invention below are specific and preferable examples of the present invention. The numerical values, shapes, constituent elements, arrangement positions of and connecting schemes between the constituent elements are examples and shall not be defined as they are. The present invention shall be defined only by claims. Hence, among the constituent elements in the embodiments, those not described in an independent claim are not necessarily required to achieve the objects of the present invention; however, such constituent elements are introduced to implement a preferable form of the present invention.

[Embodiment 1]

Figure 1:
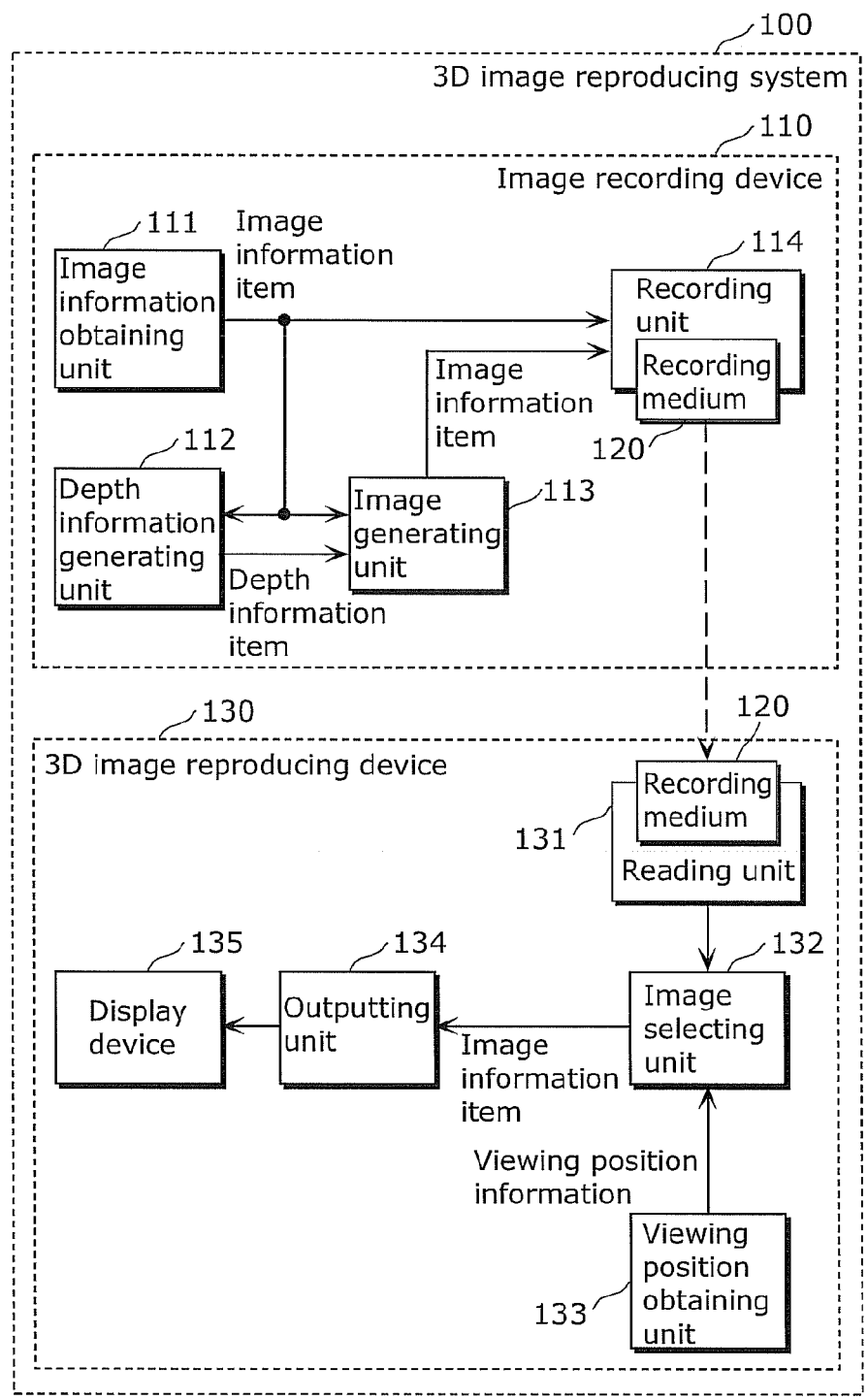
FIG. 1 represents a block diagram illustrating a structure of a 3D image reproducing system according to Embodiment 1.

FIG. 1 represents a block diagram illustrating a structure of a 3D image reproducing system according to Embodiment 1.

A 3D image reproducing system 100 includes an image recording device 110, a recording medium 120, and a 3D image reproducing device 130.

First, the image recording device 110 is described in detail.

The image recording device 110 includes an image information obtaining unit 111, a depth information generating unit 112, an image generating unit 113, and a recording unit 114.

The image information obtaining unit 111 obtains multiple 2D still images (hereinafter referred to as "image") each presenting an object viewed from different viewpoints, as well as information items each indicating a corresponding one of the positions of the viewpoints. In Embodiment 1, the image information obtaining unit 111 may be an imaging device for obtaining a 3D image, for example. The imaging device can simultaneously obtain a left-eye image (first image) and a right-eye image (second image).

The first image is obtained from a first viewpoint. The image information obtaining unit 111 obtains the first image along with a viewpoint position information item indicating the first viewpoint. Similarly, the second image is obtained from a second viewpoint. The image information obtaining unit 111 obtains the second image along with a viewpoint position information item indicating the second viewpoint.

It is noted that the above image information obtaining unit 111 shall not be limited to the above configuration. For example, the image information obtaining unit 111 may obtain a left-eye image and a right-eye image captured from 3D video signals (left-eye image signal and right-eye image signal) provided via broadcast, communications, a package medium, and the like.

Based on image information items on the images obtained by the image information obtaining unit 111, the depth information generating unit 112 generates depth information items each of which indicates a depth of the object included in the images. The depth information item indicates a position of each of the points on the object in depth direction. How the depth information generating unit 112 obtains the depth information item will be described later.

Using the depth information items generated by the depth information generating unit 112 and the image information items on the images obtained by the image information obtaining unit 111, the image generating unit 113 generates multiple virtual images (third images) of the object viewed from a viewpoint (third viewpoint) which is different from the first viewpoint and the second viewpoint. Specifically, the image generating unit 113 is a graphic processor which can execute processing, such as affine transform and texture mapping, of the image information items. The graphic processor may be one such as for a video game console and a PC graphics board. The details of the image generating processing by the image generating unit 113 will be described later.

The recording unit 114 records on the recording medium 120 an image file which holds the first image and the second image obtained by the image information obtaining unit 111 and the virtual images generated by the image generating unit 113 in association with viewpoint position information items each corresponding to one of the first image, the second image, and the virtual images.

The recording unit 114 may be, for example, bridge media readers, such as secure digital (SD) card and a hard disk drive (HDD) connected to a universal serial bus (USB), and a drive for package media such as a Blu-ray (Registered) disc.

An exemplary file format for the image file is the Multi Picture Format (MPO file); however, the file format shall not be limited to the Multi Picture Format.

The recording medium 120 corresponds to the recording unit 114. Examples of the recording medium 120 include bridge media such as an SD card and an HDD connected to an USB, and package media such as a Blu-ray disc.

It is noted that the recording unit 114 and the recording medium 120 do not necessarily need to be physically connected with each other. The image file may be written in the recording medium 120 via wireless communications and the like.

Next, the 3D image reproducing device 130 is described in detail.

The 3D image reproducing device 130 includes a reading unit 131, an image selecting unit 132, a viewing position obtaining unit 133, an outputting unit 134, and a display device 135.

The reading unit 131 reads the image file written in the recording medium 120 and outputs the image file to the image selecting unit 132. The reading unit 131 is one of a reader and a drive which corresponds to the recording medium 120. Examples of the reading unit 131 include bridge media readers such as an SD card and an HDD connected to an USB, and a drive for package media such as a Blu-ray disc. As described above, the image recording device 110 records on the image file multiple images and viewpoint positions each corresponding to one of the images.

The viewing position obtaining unit 133 obtains, from the viewer, information indicating the position of the viewer (viewing position) with respect to the display device 135. For example, the viewer can enter, into the viewing position obtaining unit 133, the angle and the distance between the current position of the user and the display device 135, by operating a button of a remote control.

Moreover, for example, the 3D image reproducing device 130 may include an in-camera for detecting the position of the viewer. Here, the viewing position obtaining unit 133 can obtain a viewing position information item from a viewer image obtained by the in-camera.

Furthermore, in the case where the 3D image reproducing device 130 is such as a handheld device and a tablet terminal which receives an operation via a touch panel provided onto a display surface, the viewing position information item may be entered with an operation onto the touch panel. Specifically, for example, the viewing position obtaining unit 133 may obtain a viewing position information item entered by the viewer onto the touch panel with various gesture operations (such as pinch-in and pinch-out). In addition, the viewing position obtaining unit 133 may obtain a viewing position information item entered with a user operation to graphical user interface (GUI) including a scroll bar displayed on the display device.

Moreover, in the case where the 3D image reproducing device 130 is such as a handheld device and a tablet terminal, the viewing position obtaining unit 133 may obtain a viewing position information item using an angular velocity sensor and an orientation sensor included in the 3D image reproducing device 130. Specifically, the viewing position obtaining unit 133 may detect the tilt of the 3D image reproducing device 130 by the above sensors and obtain the detected information as the viewing position information item. In other words, the viewing position obtaining unit 133 may obtain a relative positional relationship between the viewer and the display device 135 as the viewing position information item. Hence, when the 3D image reproducing device 130 is tilted, the viewer can view the 3D image from a different angle.

The image selecting unit 132 selects, from among the multiple images recorded on the image file, (i) an image whose viewpoint position is on the left of a viewing position as a left-eye image and (ii) an image whose viewpoint position is on the right of the viewing position as a right-eye image.

The outputting unit 134 alternately outputs to the display device 135 the left-eye image and the right-eye image selected by the image selecting unit 132.

The display device 135 displays the right-eye image and the left-eye image outputted by the outputting unit 134. The display device 135 is a display for presenting a 3D image by alternately displaying a left-eye image and a right-eye image at a constant period. The viewer wears a pair of eyeglasses for viewing a 3D image and views the display. The eyeglasses for viewing a 3D image have liquid crystal shutters each provided to one of the right lens and the left lens and synchronously opening and closing with the timing of presenting the left-eye image and the right-eye image on the display. Hence, the viewer can view a 3D image. Here, the outputting unit 134 synchronously outputs, to the eyeglasses for a 3D image, the left-eye image and the right-eye image with the presenting timing, as well as opening and closing directions with the timing of outputting the left-eye image and the right-eye image.

It is noted that an example of the display device 135 may be a liquid crystal display having a lenticular lens on the display surface, which is capable of presenting a 3D image without eyeglasses for viewing a 3D image. In addition, the display device 135 may be a head-mounted display which directly presents different images to the right eye and the left eye. Moreover, the display device 135 may be a display screen for a handheld device and a tablet terminal such as a smartphone which is capable of displaying a 3D image.

Described next is an operation of the image recording device 110 according to Embodiment 1 of the present invention.

Figure 2:
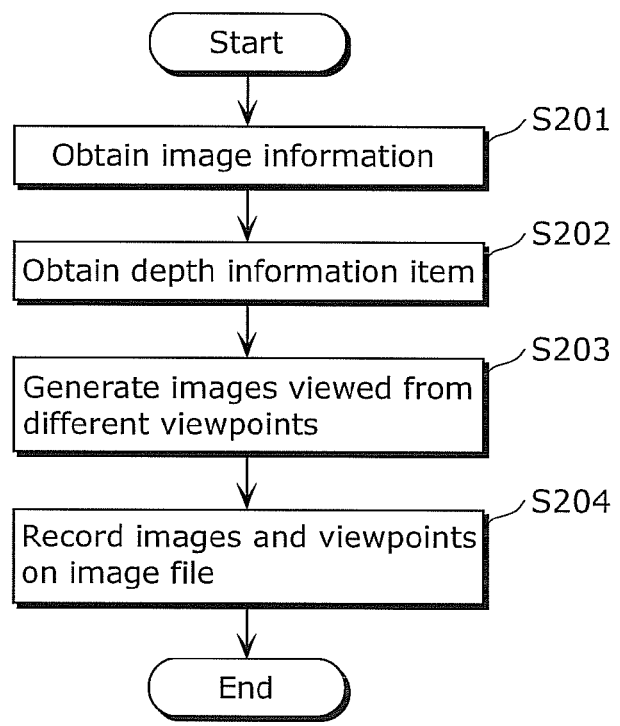
FIG. 2 represents a flowchart of an operation of an image recording device according to Embodiment 1.

FIG. 2 represents a flowchart of the operation of the image recording device 110.

First, the image information obtaining unit 111 obtains a first image 241b and a second image 241c which include an object 200, as well as a viewpoint position information item 242b and a viewpoint position information item 242c respectively on the first image 241b and the second image 241c (FIG. 2: S201).

Figure 3:
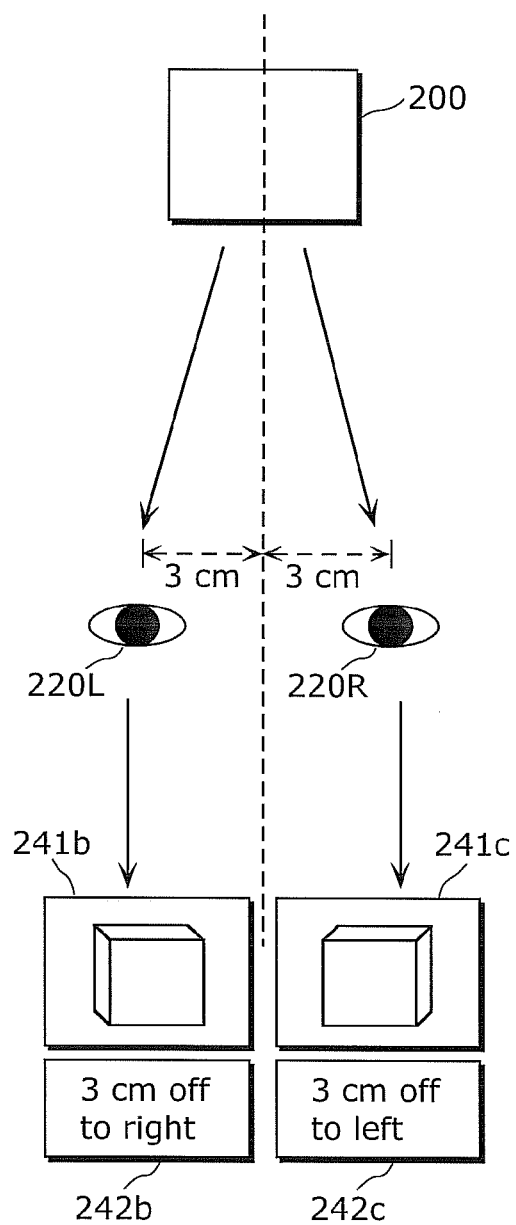
FIG. 3 represents a schematic view illustrating how an image information obtaining unit according to Embodiment 1 obtains an image.

FIG. 3 represents a schematic view illustrating the image obtaining technique employed by the image information obtaining unit 111 according to Embodiment 1.

FIG. 3 represents a relationship between the object 200 viewed from the top and first and second viewpoints 220L and 220R.

The object 200 is the entity of an object included in an image obtained by the image information obtaining unit 111. The example in FIG. 3 illustrates that the object 200 is a cuboid placed so that the top of the cuboid goes in parallel with the drawing seen from the top.

The first image 241b includes the object 200 captured from the first viewpoint 220L. The viewpoint position information item 242b indicates a viewpoint position of the first viewpoint 220L. Specifically, in FIG. 2, the viewpoint position information item 242b indicates that the first viewpoint 220L is located at the distance of 3 cm off to the left from the front (center) of the object 200.

Similarly, the second image 241c includes the object 200 captured from the second viewpoint 220R. The viewpoint position information item 242c indicates a viewpoint position of the second viewpoint 220R. Specifically, the viewpoint position information item 242c indicates that the second viewpoint 220R is located at the distance of 3 cm off to the right from the front (center) of the object 200.

It is noted that, in the example in FIG. 3, the image information obtaining unit 111 obtains images of the object 200 each viewed from a different one of two viewpoints; instead, the image information obtaining unit 111 may obtain images of the object 200 each viewed from a different one of three viewpoints.

Next, the depth information generating unit 112 obtains depth information items indicating the depths of the object 200 in each of the first image 241b and the second image 241c (FIG. 2: S202).

Specifically, first, the depth information generating unit 112 obtains (i) any given point on the object 200 included in one of the first image 241b and the second image 241c and (ii) another point corresponding to the any given point and found in the other one of the images. The above corresponding two points are obtained, for example, through detection of a point (edge) showing a sudden change in luminance and hue in the images.

Then, using trilateration, the depth information generating unit 112 obtains depth information items indicating the depths of the object from (i) the corresponding two points and (ii) the distances of the first and second viewpoints 220L and 220R respectively obtained from the viewpoint position information items 242b and 242c.

It is noted that the above is an example of algorithms for obtaining the depth information items. How to obtain the depth information items shall not be limited to the above.

For example, the depth information generating unit 112 may obtain images from imaging devices arranged in a matrix, and obtain a depth information item for each of the images.

In addition, for example, the image recording device 110 may emit an infrared grid to the object 200, and the depth information generating unit 112 may obtain a depth information item by measuring the position of the object 200. Moreover, the image recording device 110 may emit an ultrasonic wave and the like to the object 200, and the depth information generating unit 112 may obtain a depth information item by measuring the arrival time period of the reflected ultrasonic wave.

Next, the image generating unit 113 generates a 3D model of the object 200 by consolidating the depth information items each for one of the images generated by the depth information generating unit 112, and generates images (third image and fourth image) including the object 200 viewed from a viewpoint (third viewpoint) different from the first and second viewpoints (FIG. 2: S203). The first image 241b, the second image 241c, the third image 241a and the fourth image 241d allow the viewer to three-dimensionally view the object 200 when reproduced by an after-described 3D image reproducing unit 130 as left-eye images and right-eye images.

Figure 4:
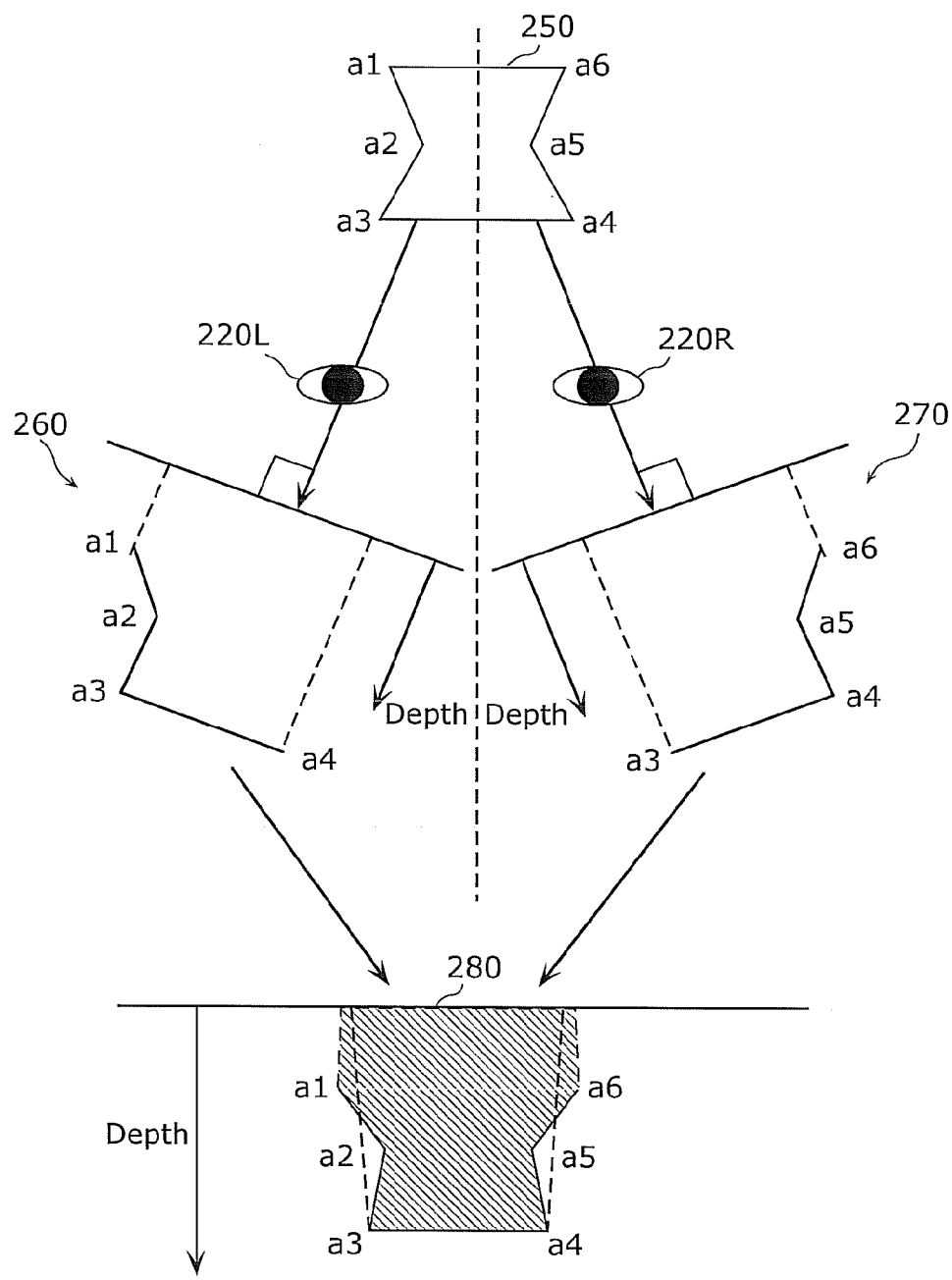
FIG. 4 represents a schematic view illustrating how to combine depth information items.

FIG. 4 represents a schematic view illustrating how to combine depth information items.

FIG. 4 represents a top view of an object 250. In other words, FIG. 4 represents consolidating depth information items for pixel rows corresponding to the top surface of the object 250 included in an image. The example in FIG. 3 illustrates that the object 200 is a cuboid and rectangular when viewed from the top. The object 250 illustrated in FIG. 4 is a polygon having six vertices when viewed from the top. In addition, each of the vertices of the polygon has a reference of a1 to a6 for the sake of explanation.

A depth information item 260 is depth information for an image of the object 250 captured from the viewpoint 220L. The dotted lines in the depth information item 260 indicate portions whose depth information cannot be obtained from the position of the viewpoint 220L. Since the vertices a5 and a6 cannot be viewed from the viewpoint 220L, the depth information generating unit 112 cannot obtain the depth information for the portions of the vertices a5 and a6 of the image of the object 250 captured from the viewpoint 220L. Similarly, for the back of the vertex a1 of the image of the object 250 captured from the viewpoint 220L, it is unknown whether or not the object 250 is found from the viewpoint 220L. In other words, the depth information generating unit 112 cannot obtain the depth information for the portions of the vertices a1 to a3.

A depth information item 270 is depth information for an image of the object 250 captured from the viewpoint 220R. The dotted lines in the depth information item 270 indicate portions whose depth information cannot be obtained from the position of the viewpoint 220R. Since the vertices a1 and a2 cannot be viewed from the viewpoint 220R, the depth information generating unit 112 cannot obtain the depth information for the portions of the vertices a1 and a2 of the image of the object 250 captured from the viewpoint 220R. Similarly, for the back of the vertex a6 of the image of the object 250 captured from the viewpoint 220R, it is unknown whether or not the object 250 is found from the viewpoint 220R. In other words, the depth information generating unit 112 cannot obtain the depth information for the portions of the vertices a4 to a6.

The image generating unit 113 combines the depth information item 260 and the depth information item 270 to generate a depth information item 280. The combination of the depth information items 260 and 270 makes it possible to mutually complement depth information which cannot be obtained in each of the images. As a result, the depth information item 280 that is combined into indicates a shape of the object 250 in a form closer to the complete form.

Hence, how to combine depth information items has been described for pixel rows corresponding to the top surface of the object 250. Similarly, depth information items combined for each of pixel rows in a horizontal direction of the images can be obtained. Based on the depth information item that is combined into, the image generating unit 113 generates a 3D model of the object 250.

Next, using the 3D model, the image generating unit 113 obtains images of the object viewed from different viewpoints.

Figure 5:
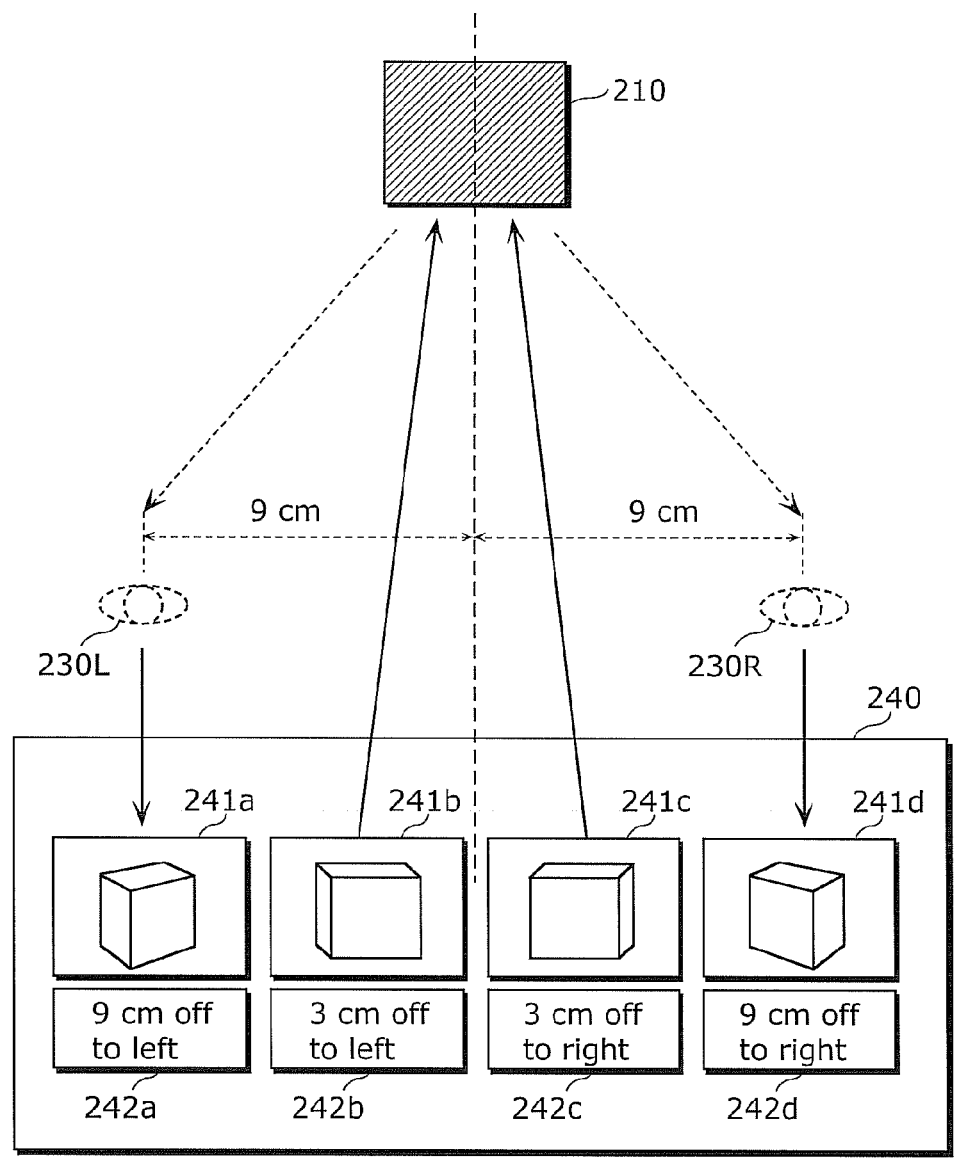
FIG. 5 represents a schematic view illustrating how to generate and record images of an object viewed from different viewpoints.

FIG. 5 represents a schematic view illustrating how to generate and record images of the object 200 viewed from different viewpoints. FIG. 5 represents a relationship between a 3D model 210 viewed from the top and viewpoints 230L and 230R which are different from the first and second viewpoints.

The 3D model 210 is of the object 200 represented in FIG. 3 and generated with the technique in FIG. 4.

The image generating unit 113 obtains a projective image of the 3D model 210 viewed from the viewpoint 230L to obtain a third image 241a viewed from the viewpoint 230L. The viewpoint 230L is located at the distance of 9 cm off to the left from the front of the 3D model 210.

Similarly, the image generating unit 113 obtains a projective image of the 3D model 210 viewed from the viewpoint 230R to obtain a fourth image 241d viewed from the viewpoint 230R. The viewpoint 230R is located at the distance of 9 cm off to the right from the front of the 3D model 210.

Hence, by obtaining projective images of the 3D model 210 viewed from viewpoints which are different from the first and second viewpoints, the image generating unit 113 generates multiple images of the object 200 viewed from different viewpoints.

It is noted that, in the example in FIG. 5, the viewpoint positions for the generated images are approximately 3 cm to 9 cm distant from the front of the 3D model 210. Actually, however, the image generating unit 113 generates multiple images viewed from positions in an area which can include viewing positions of the viewer.

Next, the recording unit 114 associates the first image 241b, the second image 241c, the third image 241a, and the fourth image 241d with a corresponding one of the viewpoint positions (viewpoint position information items 242a to 242d), and records the images on a single image file 240 (FIG. 2: S204). The image file 240 is recorded on the recording medium 120.

It is noted that even though the image information obtaining unit 111 obtains images of the object 200 seen only from a single viewpoint, images of the object 200 viewed from different viewpoints can be generated.

In such a case, the image generating unit 113 may generate an image from a different viewpoint using, for example, a heuristic of a color included in the image. Furthermore, for example, the image generating unit 113 may use an algorithm for a pseudo 3D function used for a display device capable of presenting a 3D image (such as a commercially available 3D TV). Moreover, in the case where the image information obtaining unit 111 obtains an image captured from a video signal, the image generating unit 113 may generate an image viewed from a different viewpoint using motion vectors calculated from the obtained image and images preceding and succeeding the image.

As described above, in the image recording device 110, each of multiple images of the object 200 viewed from different viewpoints is recorded in association with a corresponding viewpoint position. Such a feature can decrease image processing load on the after-described 3D image reproducing device 130 and reproduce a 3D image from various viewpoints on a real-time basis.

Described next in detail is an operation of the 3D image reproducing device 130 according to Embodiment 1.

Figure 6:
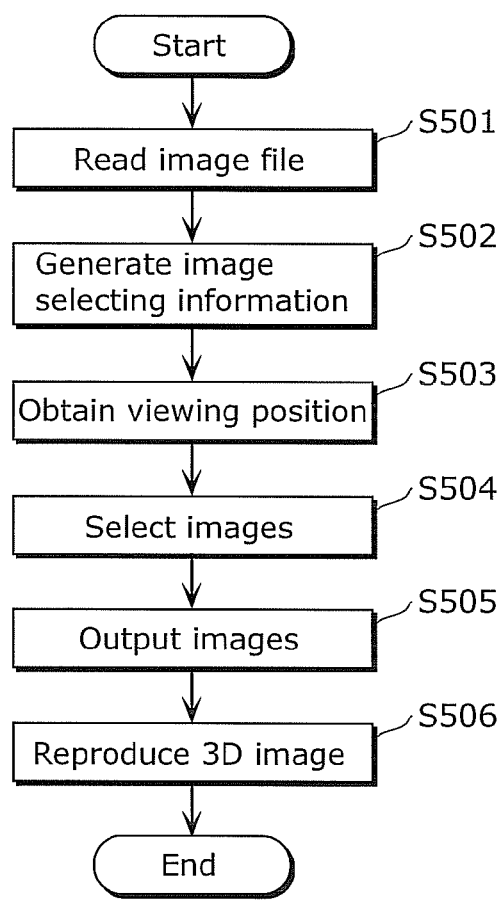
FIG. 6 represents a flowchart of an operation of a 3D image reproducing device according to Embodiment 1.

FIG. 6 represents a flowchart of the operation of the 3D image reproducing device 130.

First, the reading unit 131 reads from the recording medium 120 the image file 240 recorded by the image recording device 110 (FIG. 6: S501).

Next, the image selecting unit 132 generates image selecting information from multiple images of the object 200 viewed from different viewpoints and viewpoint positions each for a different one of the images (FIG. 6: S502).

FIG. 7A represents an example of image selecting information.

Image selecting information 300 is for separating an area which can include viewing positions into multiple viewing position areas, and associating each of the viewing position areas with a corresponding pair of a left-eye image and a right-eye image to be presented to the viewer located in the viewing position area.

FIG. 7B represents a top view illustrating exemplary viewing position areas.

As represented in FIG. 7B, the viewing position areas in the image selecting information 300 are likely to include a viewing position of a viewer 310. The viewing position areas may represent, for example, six areas A1 to A6.

When the display device 135 and the viewer 310 are viewed from the top, the area A1 is (i) one of the two areas defined by a straight line 320 connecting the display device 135 and the viewer 310 who is located in front of the display device 135 and by a straight line at 45 degrees to the straight line 320, and (ii) located to the far left of the viewer 310. The area A1 corresponds to the area referred to as "45 degrees or greater to the left" under viewing position area in FIG. 7A.

Similarly, the area A6 is (i) one of the two areas defined by the straight line 320 and a straight line at 45 degrees to the straight line 320, and (ii) located to the far right of the viewer 310. The area A6 corresponds to the area referred to as "45 degrees or greater to the right" under viewing position area in FIG. 7A.

The area A2 is (i) one of the areas defined by the straight line at 45 degrees to the straight line 320 and by a straight line at 15 degrees to the straight line 320, and (ii) located to the far left of the viewer 310. The area A2 corresponds to the area referred to as "Between 15 degrees or greater and smaller than 45 degrees to the left" under viewing position area in FIG. 7A.

The area A5 is (i) one of the areas defined by the straight line at 45 degrees to the straight line 320 and by a straight line at 15 degrees to the straight line 320, and (ii) located to the far right of the viewer 310. The area A5 corresponds to the area referred to as "Between 15 degrees or greater and smaller than 45 degrees to the right" under the viewing position area in FIG. 7A.

The area A3 is (i) one of the areas defined by the straight lines at 15 degrees to the straight line 320a, and (ii) closer to the display device 135. The area A3 corresponds to the area referred to as "Angle: Between 15 degrees to the left and 15 degrees to the right exclusive, Distance: Close" under viewing position area in FIG. 7A.

The area A4 is (i) one of the areas defined by the straight lines at 45 degrees to the straight line 320, and (ii) farther from the display device 135. The area A4 corresponds to the area referred to as "Angle: Between 15 degrees to the left and 15 degrees to the right exclusive, Distance: Far" under viewing position area in FIG. 7A.

In FIG. 7A, each of the viewing position areas is associated with a left-eye image and a right-eye image to be presented to the viewer 310 located in the viewing position area. Each viewing position area is associated with an image (left-eye image) obtained at a viewpoint position to the left of the viewer found in the viewing position area and an image (right-eye image) obtained at a viewpoint position to the right of the viewer in the viewing position area. In the example in FIG. 7A, the image selecting unit 132 associates the area A2 with the third image 241a as the left-eye image and with the second image 241c as the right-eye image.

In addition, the image selecting unit 132 associates the area A1 located to the left of the area A2 with images whose viewpoint positions are located to the far left than the images associated with the area A2. Specifically, in the example in FIG. 7A, the right-eye image associated with the area A1 is the first image 241b. The viewpoint position information item 242b for the first image 241b indicates a viewpoint position to the far left of the viewpoint position information item 242c for the second image 241c that is the right-eye image associated with the area A2.

As described above, the image selecting unit 132 associates a viewing position area with a left-eye image and a right-eye image based on viewpoint position information for each of the image recorded on an image file.

Next, the viewing position obtaining unit 133 obtains information indicating a viewing position of the viewer 310 (FIG. 6: S503).

Then, the image selecting unit 132 selects a left-eye image and a right-eye image to be presented to the viewer 310, based on the image selecting information 300 and the viewing position, of the viewer 310, obtained by the viewing position obtaining unit 133 (FIG. 6: S504). When the viewer 310 is located in the area A4 as represented in FIG. 7B, for example, the image selecting unit 132 selects the first image 241b for the left-eye image and the second image 241c for the right-eye image, both the first and second images corresponding to the area A4 in the image selecting information 300 in FIG. 7A.

Finally, the outputting unit 134 alternately outputs the selected left-eye image and right-eye image to the display device 135 (FIG. 6: S505). The display device 135 alternately displays the left-eye image and right-eye image obtained from the outputting unit 134 (FIG. 6: S506).

Hence, from images previously recorded by the image recording device 110 on an image file, a left-eye image and a right-eye image are selected and displayed, which contributes to decreasing image processing load of the 3D image reproducing device 130. Consequently, the viewer 310 can view a 3D image from various viewpoints on a real-time basis.

It is noted that, in the image selecting information 300 in FIG. 7A, the image selecting unit 132 associates a viewing position area with a left-eye image and a right-eye image so that the disparity between the left-eye image and the right-eye image increases with a decreasing distance between the viewing position of the viewer 310 and the display device 135. For example, in the areas A3 and A4, the angles with respect to the display device 135 fit in the same range between 15 degrees left and 15 degrees right exclusive; however, the distances from the display device 135 to each of the areas A3 and A4 are different, and different left-eye and right-eye images are selected in the areas A3 and A4.

Specifically, when the viewer 310 is located in the area A3, the image selecting unit 132 selects the third image 241a for a left-eye image and the fourth image 241d for a right-eye image based on the image selecting information 300 in FIG. 7A. The viewpoint position information item 242a for the third image 241a is 9 cm off to the left, and the viewpoint position information item 242d for the fourth image 241d is 9 cm off to the right.

In contrast, when the viewer 310 is located in the area A4, which is farther than A3 from the display device 135, the image selecting unit 132 selects the first image 241b as a left-eye image and the second image 241c as a right-eye image, based on the image selecting information 300 in FIG. 7A. The viewpoint position information item 242b for the first image 241b is 3 cm off to the left, and the viewpoint position information item 242c for the second image 241c is 3 cm off to the right. In other words, when the viewer 310 is located in the area A4 which is farther than A3 from the display device 135, the disparity between the left-eye image and the right-eye image is smaller than the disparity between the images for the viewer located in the area A3.

Hence, the disparity between a left-eye image and a right-eye image to be selected is made greater as the distance between the viewer 310 and the display device 135 is shorter, which contributes to presenting an image more three-dimensionally as the viewer 310 comes closer to the image.

It is noted that the image selecting information 300 may be previously recorded on the image file 240 by the image recording device 110.

In addition, the image selecting information 300 in FIG. 7A represents a width extending capability.

FIG. 8 represents a schematic view for explaining the width extending capability.

The width (size) in appearance of the display screen for the display device 135 varies depending on the position of the viewer 310. In FIG. 8, for example, a viewer 310a sees the width in appearance of the display screen for the display device 135 as a length Wa which is the same in length as the actual width of the display screen. The 3D image actually presented to the viewer 310a is one represented in the illustration (a) in FIG. 8.

In FIG. 8, however, a viewer 310b sees the width in appearance of the display screen for the display device 135 as a length Wb which is shorter than the actual width of the display screen. The 3D image presented to the viewer 310b is one which is reduced in width direction (horizontal direction) as represented in the illustration (b) in FIG. 8. Similarly, a viewer 310c sees the width in appearance of the display screen for the display device 135 as a length Wc which is shorter than the actual width of the display screen. The 3D image presented to the viewer 310c is one which is reduced in width direction (horizontal direction) as represented in the illustration (c) in FIG. 8.

Taking into consideration the size of the display screen viewed from the positions of the viewers, the width extending capability is to enlarge a 3D image in horizontal direction and display the enlarged 3D image.

Specifically, the outputting unit 134 enlarges left-eye and right-eye images in a horizontal direction with a decreasing angle formed between (i) the straight line from a viewing position to the center of the display screen for the display device 135 and (ii) the display screen (θb and θc in FIG. 8), and outputs the enlarged images.

As a result of the enlargement by the outputting unit 134 of the left-eye and the right-eye images, the viewer 310b views a 3D image (b)' and the viewer 310c views a 3D image (c)'. In FIG. 8, θb is greater than θc. Hence, the left-eye and right-eye images forming the 3D image (c) are enlarged for output greater than the left-eye and right-eye images forming the 3D image (b).

In Embodiment 1, the outputting unit 134 enlarges an image based on the image selecting information 300 generated by the image selecting unit 132 in FIG. 7A. In the image selecting information 300 in FIG. 7A, "High" in the width extending capability means that an image is enlarged greater than "Low".

Such features can present the viewer 310 with a more realistic three-dimensional view of an object.

It is noted that, in the descriptions of the operations in FIGS. 7A and 7B, finite viewing position areas which can be viewing positions are each associated with a different pair of a left-eye image and a right-eye image. Here, the 3D image reproducing device 130 only discretely reproduce infinite 3D images based on the combination of the images recorded on the image file 240.

However, the 3D image reproducing device 130 may interpolate the images using a linear or non-linear function, and continuously reproduce 3D images. For example, the 3D image reproducing device 130 may obtain depth information items each for one of the first image and the second image recorded on the image file 240, generate a new image viewed from a viewpoint position between the viewpoint position of the recorded first image and the viewpoint position of the recorded second image, and reproduce the new image. Such features allow the 3D image reproducing device 130 to continuously reproduce 3D images.

It is noted that the image selecting unit 132 may change left-eye and right-eye images to be selected, depending on the size of the display screen for the display device 135.

If the distance, between viewpoint positions each for one of two images (left-eye image and right-eye image) selected by the image selecting unit 132, is short relative to the size of the display screen for the display device 135, the viewer 310 inevitably feels the recorded depth of the object to be greater than the actual depth of the object. Hence, the image selecting unit 132 may select a left-eye image and a right-eye image so that the disparity between the left-eye image and the right-eye image decreases with an increasing size of the display screen for the display device 135. Such a feature contributes to displaying a more realistic 3D image.

It is noted that if the display device 135 is capable of adjusting, on the display screen, an area to display an image, the image selecting unit 132 may select an image depending on the size of the display area to present the image.

In addition, the viewer 310 may arbitrarily adjust a perceived depth (disparity between a left-eye image and a right-eye image) of a 3D image. Specifically, the viewing position obtaining unit 133 may obtain depth adjustment information for adjusting a depth to be inputted by the viewer 310, and the image selecting unit 132 may select a left-eye image and a right-eye image based on the depth adjustment information.

In the 3D image reproducing system 100 according to Embodiment 1, as described above, the image recording device 110 associates each of multiple images viewed from a different viewpoint with a corresponding one of viewpoint positions, and records the images on a single image file. From among the images each viewed from a different viewpoint, the 3D image reproducing device 130 selects a left-eye image and a right-eye image depending on a viewing position of the viewer, and reproduces the selected images.

Such features make it possible to execute effective image processing, and allow the 3D image reproducing device to reproduce a 3D image from various viewpoints on a real-time basis.

In addition, the 3D image reproducing device 130 selects left-eye and right-eye images, based on the distance between the viewer and the display device, the size of the display device, and an input by the viewer, which contributes to more appropriate reproduction of a 3D image.

Furthermore, even though the viewer looks at the display device from an angle, the 3D image reproducing device 130 enlarges left-eye and right-eye images using the width extending capability, which contributes to more natural reproduction of a 3D image.

[Embodiment 2]

Described next is Embodiment 2 of the present invention.

It is noted that, a constituent element having the same numerical reference as a constituent element in Embodiment 1 has a similar function and executes a similar operation as explained in Embodiment 1 unless otherwise noted. Thus details of such a constituent element in Embodiment 2 shall be omitted.

Figure 9:
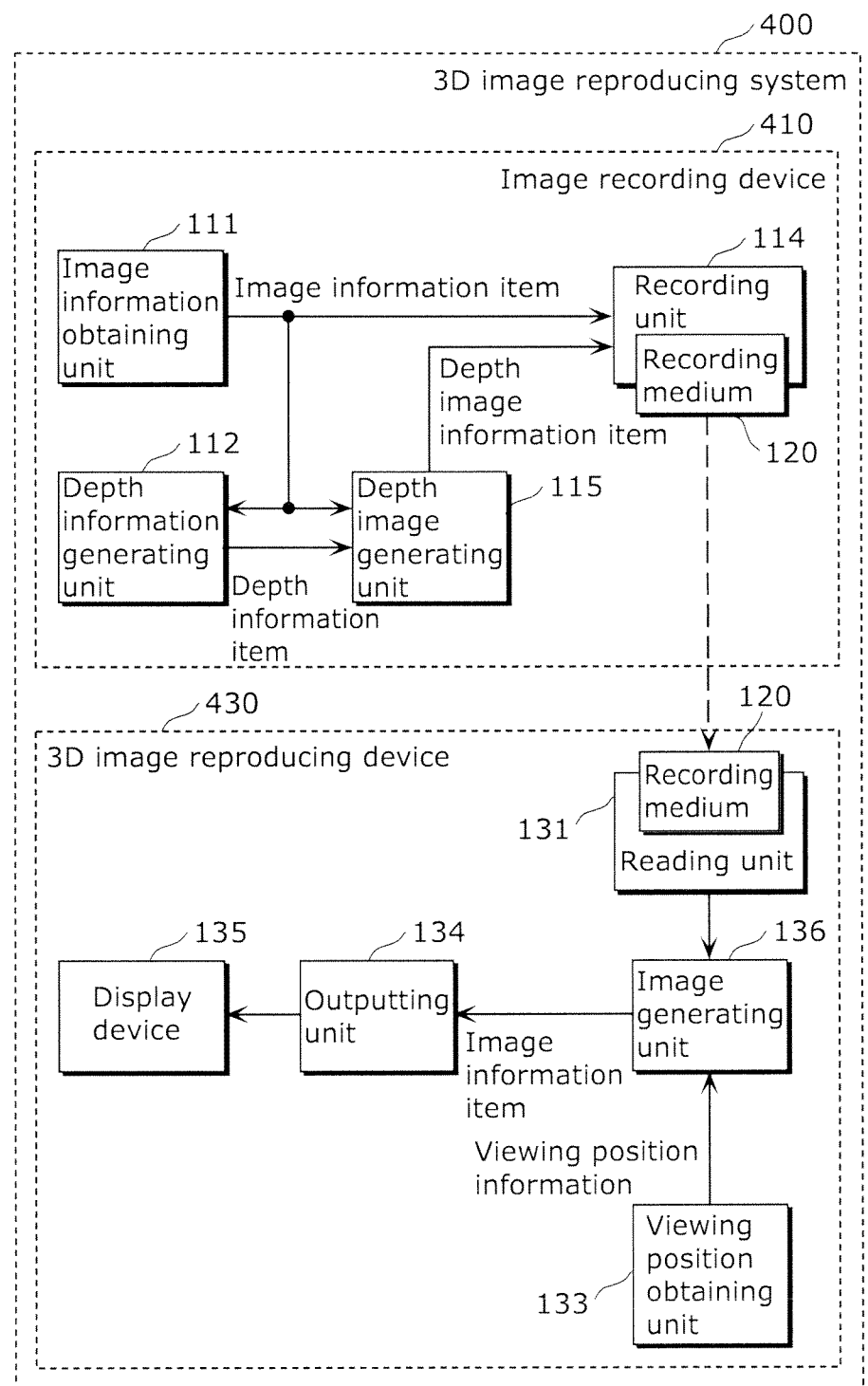
FIG. 9 represents a block diagram illustrating a structure of a 3D image reproducing system according to Embodiment 2.

FIG. 9 represents a block diagram illustrating a structure of a 3D image reproducing system according to Embodiment 2.

A 3D image reproducing system 400 includes an image recording device 410, the recording medium 120, and a 3D image reproducing device 430.

The image recording device 410 includes the image information obtaining unit 111, a depth image generating unit 115, the image generating unit 113, and the recording unit 114.

The 3D image reproducing device 430 includes the reading unit 131, an image generating unit 136, the viewing position obtaining unit 133, the outputting unit 134, and the display device 135.

Described next in detail are the entire operation of the image recording device 410 and an operation of the depth image generating unit 115.

Figure 10:
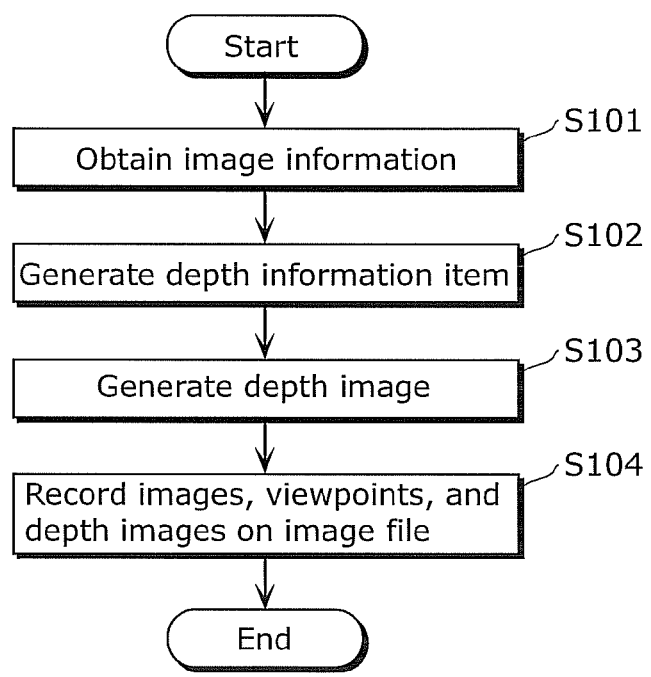
FIG. 10 represents a flowchart of an operation of an image recording device according to Embodiment 2.

FIG. 10 represents a flowchart of an operation of the image recording device 410.

Figure 11:
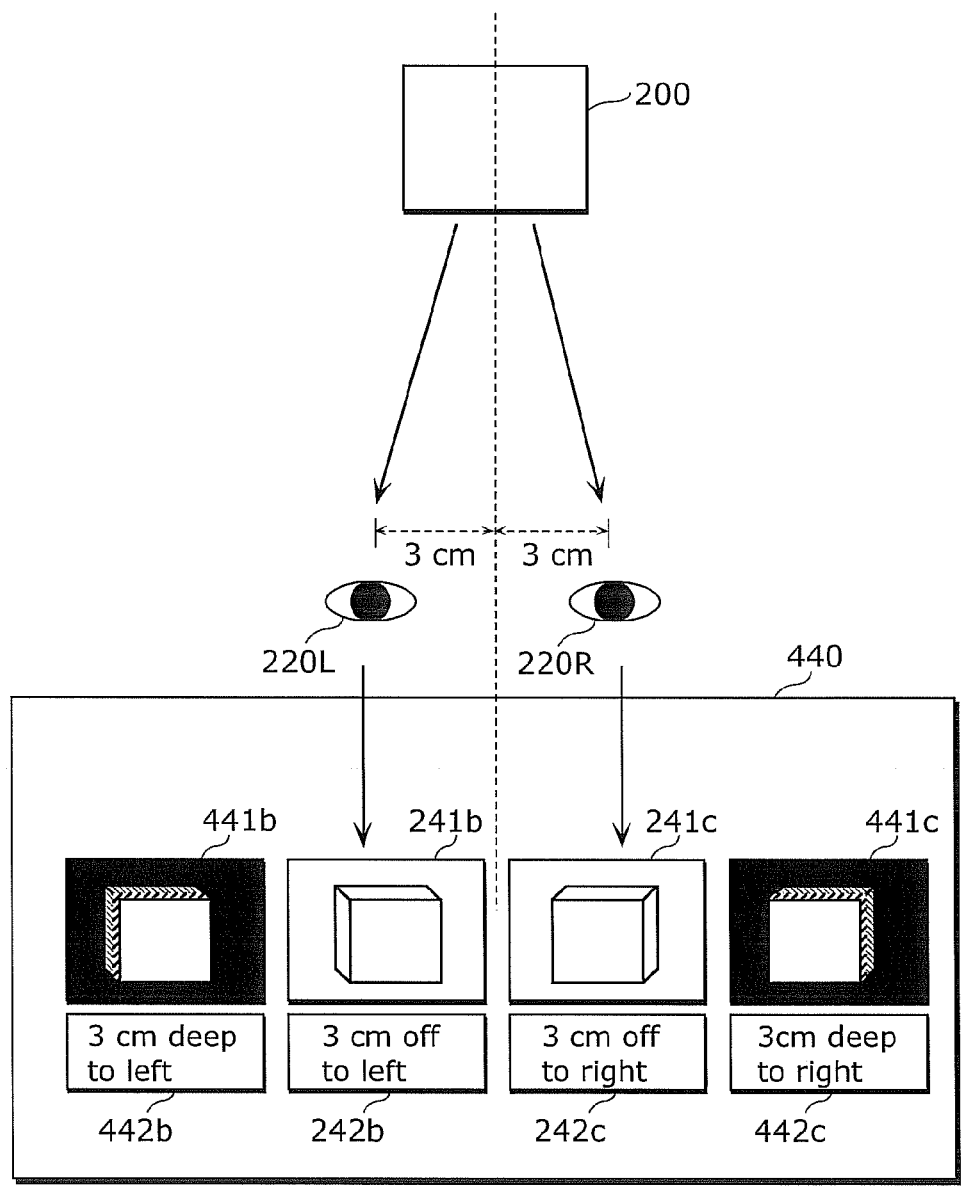
FIG. 11 represents a schematic view illustrating how to generate and record a depth image.

FIG. 11 represents a schematic view illustrating how to generate and record a depth image.

As represented in FIG. 11, the image information obtaining unit 111 obtains the first image 241*b* and the second image 241*c* which include the object 200, as well as the viewpoint position information item 242*b* and the viewpoint position information item 242*c* respectively on the first image 241*b* and the second image 241*c* (FIG. 10: S101).

Next, the depth information generating unit 112 obtains depth information items indicating the depths of the object 200 in each of the first image 241*b* and the second image 241*c* (FIG. 10: S102).

Then, the depth image generating unit 115 generates depth images each corresponding to one of the first image 241*b* and the second image 241*c* by expressing the depths indicated by the depth information items in luminance values (FIG. 10: S103).

The depth image is expressed in values indicated by a depth information item and each representing the depth of a corresponding one of pixels, and the values are luminance values of the corresponding pixel values. In other words, in Embodiment 2, the recording unit 114 records the depth information items in the same image format (for example, JPEG format) as that for the first image 241*b* and the second image 241*c*. A depth image 441*b* is expressed in luminance values, using a depth information item corresponding to the first image 241*b*. A depth image 441*c* is expressed in luminance values, using a depth information item corresponding to the second image 241*c*. It is noted that the depth information items may be recorded on the depth images, using information on hue as well as luminance.

Figure 12:
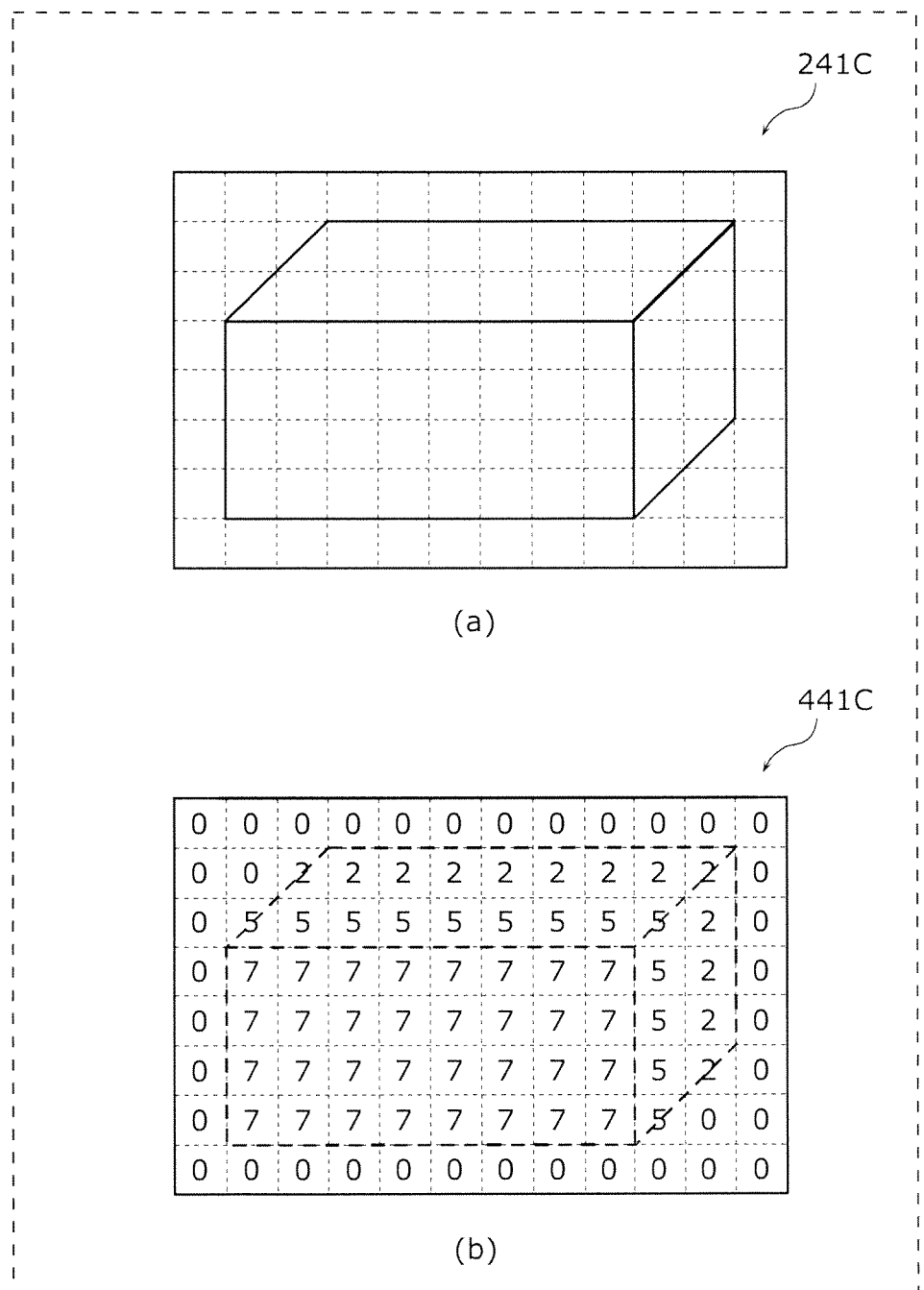
FIG. 12 represents a schematic view illustrating a depth image.

FIG. 12 represents a schematic view illustrating a depth image.

The illustration (a) in FIG. 12 is the second image 241*c*. The illustration (b) in FIG. 12 is a depth image 441*c*. The images represented in the illustrations (a) and (b) in FIG. 12 are formed of multiple pixels represented in dotted lines in the drawings. In general, an image is defined by a luminance value of each of the pixels forming the image. In FIG. 12, for example, the luminance value of each of the pixels is indicated on the eight-scale level of 0 to 7. A smaller number indicates a lower luminance (black), and a greater number indicates a higher luminance (white).

In a depth image, the luminance values of the 0 to 7 indicate depth instead of luminance. Specifically, for example, a smaller luminance value indicates that the object is located farther away from the viewer in the image, and a greater luminance value indicates that the object is located closer to the viewer in the image.

In the illustration (b) in FIG. 12, for example, the luminance value "7" indicates a part of the object 200 in the depth image 441*c*, the part being closer to the viewer. For other parts, the luminance values "5" and "2" indicate depths depending on the depths of the object 200 in the image.

In FIG. 12, it is noted that, for the pixels of portions other than the object 200 in the depth image 441*c*, the pixel value is "0" for the sake of simplicity. In reality, each of the parts other than the object 200 has a depth information item, and a pixel of a portion other than the object has a pixel value indicate the depth.

As represented in FIG. 11, the recording unit 114 respectively associates the first image 241*b* and the second image 241*c* with the viewpoint position information item 242*b* and the viewpoint position information 242*c* and with the depth image 441*b* and the depth image 441*c*, and records the associated images on an image file 440 (FIG. 10: S104). The depth images 441*b* and 442*b* hold additional information items 442*b* and 442*c* each indicating a corresponding image (viewpoint position of a corresponding image in view).

The depth information items for the first image 241*b* and the second image 241*c* are generated as the depth information items 441*b* and 441*c*, which allows the recording unit 114 to record the image file 440 in the Multi-Picture Format.

Described next in detail are the entire operation of the 3D image reproducing device 430 and an operation of the image generating unit 136.

Figure 13:
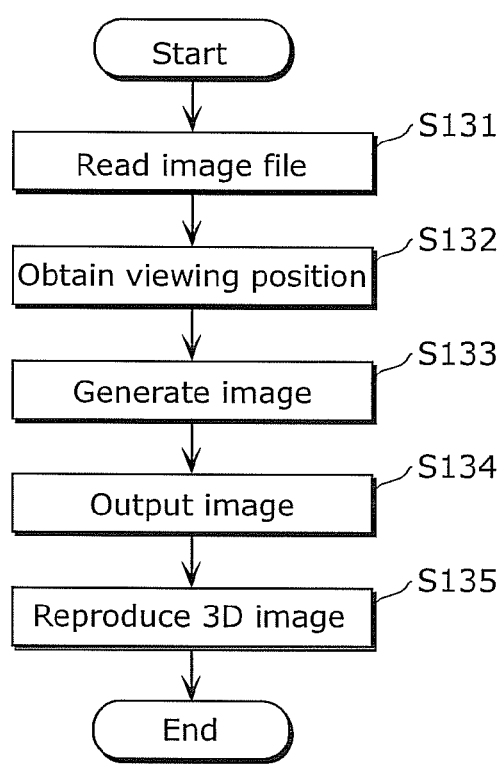
FIG. 13 represents a flowchart of an operation of a 3D image reproducing device according to Embodiment 2.

FIG. 13 represents a flowchart of the operation of the 3D image reproducing device 430.

First, the reading unit 131 reads from the recording medium 120 the image file 440 recorded by the image recording device 410 (FIG. 13: S131).

Next, the viewing position obtaining unit 133 obtains information indicating a viewing position of the viewer (FIG. 13: S132).

Then, based on the viewing position of the viewer obtained by the viewing position obtaining unit 133, the image generating unit 136 generates a left-eye image and a right-eye image to be presented to the viewer (FIG. 13: S133).

Specifically, similar to the image generating unit 113 in the image recording device 110 according to Embodiment 1, the image generating unit 136 first generates the 3D model 210 of the object 200 from the first image 241*b*, the second image 241*c*, and the depth information items 441*b* and 441*c* for the first image 241*b* and the second image 241*c*.

Then, the image generating unit 136 obtains a projective image of the 3D model 210 viewed from the viewpoint, of the viewer, obtained by the viewing position obtaining unit 133. Such features generate a left-eye image and a right-eye image viewed from the viewpoint position, of the viewer, obtained by the viewing position obtaining unit 133.

It is noted that, similar to Embodiment 1, the image generating unit 136 may generate a left-eye image and a right-eye image based on the distance between the viewer and the display device 135, the size of the display device 135, and an input by the viewer.

Finally, the outputting unit 134 outputs the generated left-eye and right-eye images to the display device 135 (FIG. 13: S134), and the display device 135 displays the left-eye and right-eye images (FIG. 13: S135).

As a matter of course, in the 3D image reproducing device 430 in Embodiment 2, the outputting unit 134 may also enlarge the left-eye and right-eye images by the width extending capability and output the enlarged images.

As described above, in the 3D image reproducing system 400 according to Embodiment 2, the image recording device 410 associates images with depth images and viewpoint positions. Here a depth image and a viewpoint position indicate a depth information item for a corresponding one of the images. Then, the image recording device 410 records the associated images, the corresponding depth images, and the corresponding viewpoint positions on a single image file. In other words, the image recording device 410 previously generates depth information items, which are a cause of high load, in image processing and records the depth information items on a file. From the images and depth images indicating the depth information items each corresponding to one of the images, the 3D image reproducing device 430 generates left-eye and right-eye images depending on a viewing position of the viewer.

Such features make it possible to execute effective image processing, and allow the 3D image reproducing device 430 to continuously reproduce 3D images from various viewpoints on a real-time basis.

Hence when the viewer moves the position of his or her body, for example, the 3D image reproducing system 400 can naturally change the appearance of a 3D image. Hence, the viewer can feel as if he or she steered away from the object, and go around to the side of the object and look at it from an angle.

A 3D image reproducing system (the image recording device and the 3D image reproducing device) according to an implementation of the present invention has been described in Embodiments 1 and 2. It is noted that the present invention may be modified as described below.

(1) Each of the aforementioned devices is, specifically, a computer system including a microprocessor, a ROM, a RAM, a hard disk unit, a display unit, a keyboard, a mouse, and so on. The RAM or hard disk unit stores a computer program. The devices achieve their functions through the microprocessor's operation according to the computer program. Here, the computer program is configured by combining instruction codes indicating instructions to the computer.

(2) A part or all of the constituent elements constituting the respective devices may be configured from a single System-LSI (Large-Scale Integration). The System-LSI is a super-multi-function LSI manufactured by integrating constituent units on one chip. Specifically, the System-LSI is a computer system including a microprocessor, a ROM, a RAM, or by means of a similar device. The RAM stores a computer program. The System-LSI achieves its functions through the microprocessor's operation according to the computer program.

(3) A part or all of the constituent elements constituting the each of the devices may be configured as an IC card which can be attached to and detached from each device or as a stand-alone module. The IC card or the module is a computer system configured from a microprocessor, a ROM, and a RAM. The IC card or the module may also be included in the aforementioned super-multi-function LSI. The IC card or the module achieves its functions through the microprocessor's operation according to the computer program. The IC card or the module may also be implemented to be tamper-resistant.

(4) The present invention may be a method to implement the above. The present invention may be a computer program for implementing the above method on a computer, and may also be a digital signal including the computer program.

Furthermore, the present invention may also be implemented in the form of the computer program or the digital signal stored in a computer readable recording medium such as a flexible disk, a hard disk, a CD-ROM, an MO, a DVD, a DVD-ROM, a DVD-RAM, a BD (Blu-ray Disc), and semiconductor memory. Furthermore, the present invention may also be the digital signal recorded on these recording media.

Furthermore, the present invention may also be implemented in the form of the aforementioned computer program or digital signal transmitted via a telecommunication line, a wireless or wired communication line, a network represented by the Internet, and data broadcast.

The present invention may also be a computer system including a microprocessor and a memory, in which the memory stores the aforementioned computer program and the microprocessor operates according to the computer program.

Furthermore, the above program or the above digital signal may be recorded on the above non-transitory computer-readable recording media for their transportation or transmitted via the above network in order to be executed on another independent computer system.

(5) Each of the embodiments and modifications may be combined.

Hence, the embodiments and modifications of the image recording device and the 3D image reproducing device according to an implementation of the present invention have been described.

In the 3D image reproducing system 100 according to Embodiment 1, the image recording device 110 associates each of multiple images viewed from a different viewpoint with a corresponding one of viewpoint positions, and records the associated images on a single image file. From among the images each viewed from a different viewpoint, the 3D image reproducing device 130 selects a left-eye image and a right-eye image depending on a viewing position of the viewer, and reproduces the selected images.

Such features make it possible to execute effective image processing, and allow the 3D image reproducing device to reproduce a 3D image viewed from various viewpoints on a real-time basis.

In the 3D image reproducing system 400 according to Embodiment 2, the image recording device 410 associates multiple images with depth images and viewpoint positions. Here a depth image and a viewpoint position indicate a depth information item for a corresponding one of the images. Then, the image recording device 410 records the associated images on a single image file. From the images and depth images indicating the depth information items each corresponding to one of the images, the 3D image reproducing device 430 generates left-eye and right-eye images depending on a viewing position of the viewer.

Such features make it possible to continuously reproduce 3D images viewed from various viewpoints on a real-time basis.

In addition, the present invention may be implemented in the forms of an image recording method and a 3D image reproducing method.

It is noted that the present invention may be implemented in the form of a video (moving images) which continuously presents images.

Figure 14:
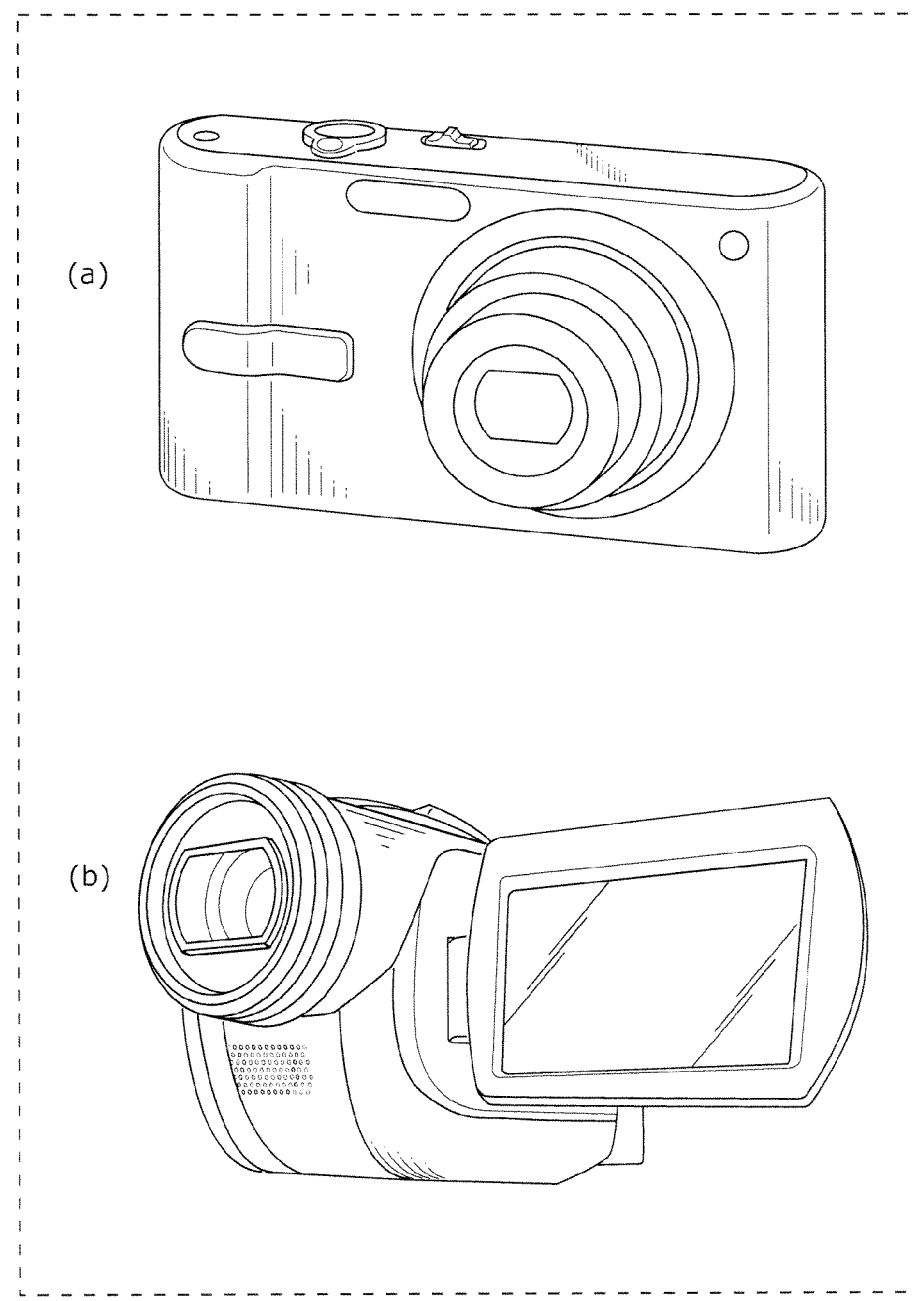
FIG. 14 represents an exemplary application of the image recording devices according to Embodiments 1 and 2 of the present invention.

Furthermore, the image recording device according to each of the embodiments may be implemented in the forms of, for example, the DSC in illustration (a) in FIG. 14 and the digital video camera in illustration (b) in FIG. 14. Here the recording medium 120 may be, for example, an SD card for recording images and videos, and the recording unit 114 may be, for example, an SD card writer (reader).

Figure 15:
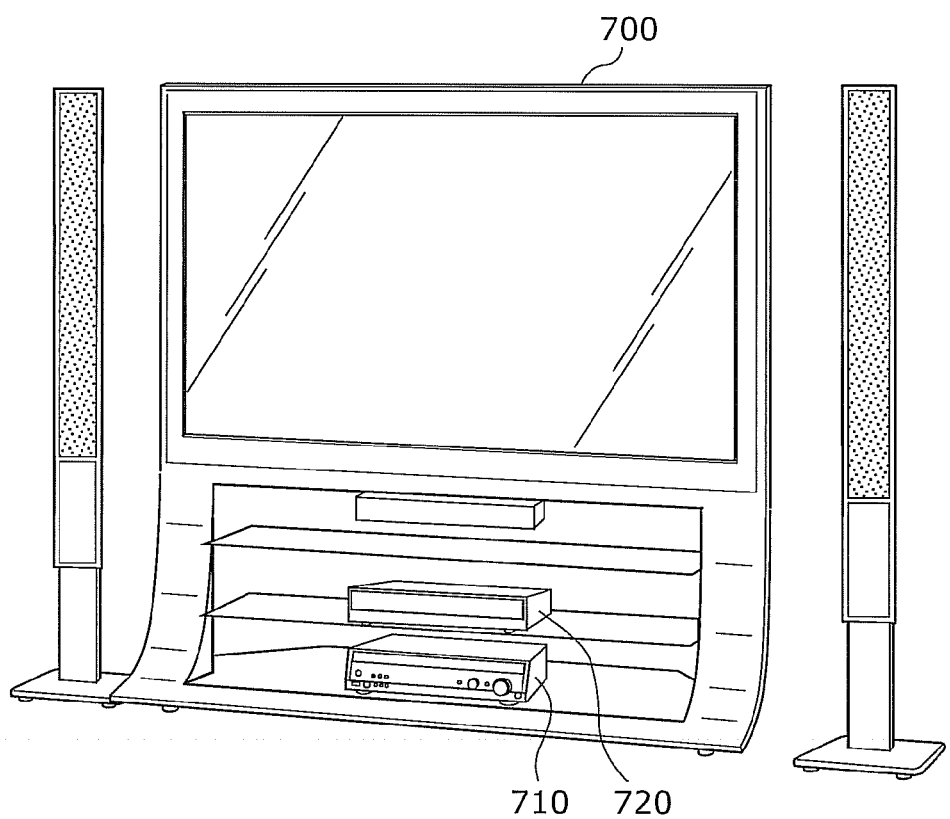
FIG. 15 represents an exemplary application of the 3D image reproducing devices according to Embodiments 1 and 2 of the present invention.

Moreover, for example, the 3D image reproducing device according to each of the embodiments may be implemented in the form of the TV 700 illustrated in FIG. 15. The specific form of the display device 135 shall not be limited in particular. Exemplary forms of the display device 135 include a liquid crystal display capable of presenting a 3D image, a plasma display, or an electro luminescence (EL) display. Here the image information obtaining unit 111 obtains images via TV broadcast, and a Blu-ray player 710, and a set-top box 720 illustrated in FIG. 15.

In addition, the 3D image reproducing device may be implemented in the form of the Blu-ray player 710. Here, the image information obtaining unit 111 obtains images from a Blu-ray disc inserted into the Blu-ray player 710. It is noted that images are obtained not only from the Blu-ray disc, but also from every recording medium such as a digital versatile disc (DVD) and a HDD.

Furthermore, the 3D image reproducing device may be implemented in the form of the set-top box 720. Here the image information obtaining unit 111 obtains images from cable TV broadcast.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

An image recording device according to an embodiment of the present invention can record an image so that the recorded image is three-dimensionally reproduced in an efficient manner. The image recording device is useful for a DSC and a digital video camera. In addition, the 3D image reproducing device according to the present invention can reproduce a 3D image from various view points, and is useful for a digital TV, a PC, and a digital photo frame capable of reproducing 3D images.

REFERENCE SIGNS LIST 100 and 400 3D image reproducing system
110 and 410 Image recording device
111 Image information obtaining unit
112 Depth information generating unit
113 Image generating unit
114 Recording unit
115 Depth image generating unit
120 Recording medium
130 and 430 3D image reproducing device
131 Reading unit
132 Image selecting unit
133 Viewing position obtaining unit
134 Outputting unit
135 Display device
136 Image generating unit
200 and 250 Object
210 3D model
220L, 220R, 230L, and 230R Viewpoint
240 and 440 Image file
241a, 241b, 241c, and 241d Image
242a, 242b, 242c, and 242d Viewpoint position information
260, 270, and 280 Depth information item
300 Image selecting information
310, 310a, 310b, and 310c Viewer
320 Straight line
441b and 441c Depth image
700 TV
710 Blu-ray player
720 Set-top box

The invention claimed is:

1. An image recording device which records, on an image file, images of an object viewed from different viewpoints, the image recording device comprising:
   an image information obtaining unit configured to obtain a first image of the object viewed from a first viewpoint, a second image of the object viewed from a second viewpoint which is different from the first viewpoint, and viewpoint positions each corresponding to one of the first viewpoint and the second viewpoint;
   a depth information generating unit configured to generate depth information items each indicating a depth of the object included in the first image and the second image, using the first image, the second image, and the viewpoint positions each for one of the first image and the second image;
   an image generating unit configured to generate a third image and a viewpoint position of the third image, using the depth information items, the first image, and the second image, the third image being of the object viewed from a third viewpoint which is different from the first viewpoint and the second viewpoint; and
   a recording unit configured to record on the image file image selecting information for: dividing an area into viewing position areas; selecting from among the first image, the second image, and the third image a left-eye image and a right-eye image to be respectively presented to a left eye and a right eye of a viewer located in one of the viewing position areas; and associating the one of the viewing position areas with the left-eye image and the right-eye image, the area including a viewing position from which a display device is viewed, and the display device displaying the images recorded on the image file.

2. The image recording device according to claim 1, wherein the image file is in a multi-picture format.

3. An image recording method for recording, on an image file, images of an object viewed from different viewpoints, the image recording method comprising:
   obtaining a first image of the object viewed from a first viewpoint, a second image of the object viewed from a second viewpoint which is different from the first viewpoint, and viewpoint positions each corresponding to one of the first viewpoint and the second viewpoint;
   generating depth information items each indicating a depth of the object included in the first image and the second image, using the first image, the second image, and the viewpoint positions each for one of the first image and the second image;
   generating a third image and a viewpoint position of the third image, using the depth information items, the first image, and the second image, the third image being of the object viewed from a third viewpoint which is different from the first viewpoint and the second viewpoint; and
   recording on the image file image selecting information for: dividing an area into viewing position areas; selecting from among the first image, the second image, and the third image a left-eye image and a right-eye image to be respectively presented to a left eye and a right eye of a viewer located in one of the viewing position areas; and associating the one of the viewing position areas with the left-eye image and the right-eye image, the area including a viewing position from which a display device is viewed, and the display device displaying the images recorded on the image file.

* * * * *